United States Patent
Bernard (10) Patent No.: US 8,150,872 B2
(45) Date of Patent: *Apr. 3, 2012

(54) MULTIMODAL NATURAL LANGUAGE QUERY SYSTEM FOR PROCESSING AND ANALYZING VOICE AND PROXIMITY-BASED QUERIES

(75) Inventor: David E. Bernard, Duluth, GA (US)

(73) Assignee: The Intellection Group, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/979,758

(22) Filed: Dec. 28, 2010

(65) Prior Publication Data

US 2011/0093271 A1   Apr. 21, 2011

Related U.S. Application Data

(63) Continuation-in-part of application No. 12/048,434, filed on Mar. 14, 2008, now Pat. No. 7,873,654, which is a continuation-in-part of application No. 11/041,605, filed on Jan. 24, 2005, now Pat. No. 7,376,645.

(51) Int. Cl.
*G06F 17/30* (2006.01)

(52) U.S. Cl. ........ 707/771; 707/708; 707/723; 707/918; 707/E17.11; 707/E17.068; 704/9; 704/246

(58) Field of Classification Search .............. 707/708, 707/723, 771, 918, E17.11, E17.068, E17.078, 707/999.004, 999.01, 999.107; 704/9, 246
See application file for complete search history.

(56) References Cited

U.S. PATENT DOCUMENTS

| | | | |
|---|---|---|---|
| 5,727,057 A * | 3/1998 | Emery et al. | 379/201.07 |
| 5,802,526 A | 9/1998 | Fawcett et al. | |
| 5,819,220 A | 10/1998 | Sarukkai et al. | |
| 6,446,064 B1 | 9/2002 | Livowsky | |
| 6,615,172 B1 | 9/2003 | Bennett et al. | |
| 6,934,684 B2 * | 8/2005 | Alpdemir et al. | 704/265 |
| 6,952,471 B1 | 10/2005 | Cannon et al. | |
| 7,233,655 B2 | 6/2007 | Gailey et al. | |
| 2001/0039493 A1 | 11/2001 | Pustejovsky et al. | |
| 2002/0169611 A1 * | 11/2002 | Guerra et al. | 704/270 |
| 2003/0023440 A1 * | 1/2003 | Chu | 704/249 |
| 2003/0115192 A1 | 6/2003 | Kil et al. | |
| 2004/0006478 A1 | 1/2004 | Alpdemir et al. | |
| 2004/0044516 A1 | 3/2004 | Kennewick et al. | |
| 2004/0117189 A1 | 6/2004 | Bennett | |
| 2004/0242160 A1 | 12/2004 | Ichikawa et al. | |
| 2005/0113115 A1 | 5/2005 | Haberman et al. | |

* cited by examiner

*Primary Examiner* — Leslie Wong
(74) *Attorney, Agent, or Firm* — Clements Bernard PLLC; Christopher L. Bernard; Lawrence A. Baratta, Jr.

(57) ABSTRACT

The present disclosure provides a natural language query system and method for processing and analyzing multimodally-originated queries, including voice and proximity-based queries. The natural language query system includes a Web-enabled device including a speech input module for receiving a voice-based query in natural language form from a user and a location/proximity module for receiving location/proximity information from a location/proximity device. The query system also includes a speech conversion module for converting the voice-based query in natural language form to text in natural language form and a natural language processing module for converting the text in natural language form to text in searchable form. The query system further includes a semantic engine module for converting the text in searchable form to a formal database query and a database-look-up module for using the formal database query to obtain a result related to the voice-based query in natural language form from a database.

12 Claims, 4 Drawing Sheets

MULTIMODAL NATURAL LANGUAGE QUERY SYSTEM FOR PROCESSING AND ANALYZING VOICE AND PROXIMITY-BASED QUERIES

CROSS-REFERENCE TO RELATED APPLICATION(S)

This application is a continuation-in-part of U.S. patent application Ser. No. 12/048,434 filed Mar. 14, 2008 now U.S. Pat. No. 7,873,654, and entitled "MULTIMODAL NATURAL LANGUAGE QUERY SYSTEM AND ARCHITECTURE FOR PROCESSING AND ANALYZING VOICE AND PROXIMITY-BASED QUERIES," which is a continuation-in-part of application Ser. No. 11/041,605, filed Jan. 24, 2005 now U.S. Pat. No. 7,376,645 issued May 20, 2008, and entitled "MULTIMODAL NATURAL LANGUAGE QUERY SYSTEM AND ARCHITECTURE FOR PROCESSING VOICE AND PROXIMITY-BASED QUERIES," the contents of each are incorporated in full by reference herein.

FIELD OF THE INVENTION

The present invention relates generally to a multimodal natural language query system for processing voice and proximity-based queries. More specifically, the present invention relates to a multimodal natural language query system for processing voice and proximity-based queries including a location or proximity system or device, such as a global positioning system (GPS), radio frequency identification (RFID) device, or the like. This location or proximity system or device provides the multimodal natural language query system and architecture with a plurality of advanced capabilities.

BACKGROUND OF THE INVENTION

The use of personal computers (PCs), personal digital assistants (PDAs), Web-enabled phones, smart phones, tablet devices, wireline and wireless networks, the Internet, Web-based query systems and engines, and the like has gained relatively widespread acceptance in recent years. This is due, in large part, to the relatively widespread availability of high-speed, broadband Internet access through digital subscriber lines (DSLs) (including asymmetric digital subscriber lines (ADSLs) and very-high-bit-rate digital subscriber lines (VDSLs)), cable modems, satellite modems, wireless local area networks (WLANs), 3G/4G wireless systems, and the like. Thus far, user interaction with PCs, PDAs, smart phones, tablet devices, Web-enabled phones, wireline and wireless networks, the Internet, Web-based query systems and engines, and the like has been primarily non-voice-based, through keyboards, mice, intelligent electronic pads, monitors, touch screens, printers, and the like. This has limited the adoption and use of these devices and systems somewhat, and it has long been felt that allowing for accurate, precise, and reliable voice-based user interaction, mimicking normal human interaction, would be advantageous. For example, allowing for accurate, precise, and reliable voice-based user interaction would certainly draw more users to e-commerce, e-support, e-learning, etc., and reduce learning curves.

In this context, "mimicking normal human interaction" means that a user would be able to speak a question into a Web-enabled device or the like and the Web-enabled device or the like would respond quickly with an appropriate answer or response, through text, graphics, or synthesized speech, the Web-enabled device or the like not simply converting the user's question into text and performing a routine search, but truly understanding and interpreting the user's question. Thus, if the user speaks a non-specific or incomplete question into the Web-enabled device or the like, the Web-enabled device or the like would be capable of inferring the user's meaning based on context or environment. This is only possible through multimodal input.

Several software products currently allow for limited voice-based user interaction with PCs, PDAs, and the like. Such software products include, for example, ViaVoice™ by International Business Machines Corp. and Dragon NaturallySpeaking™ by Scansoft, Inc. These software products, however, allow a user to perform dictation, voice-based command-and-control functions (opening files, closing files, etc.), and voice-based searching (using previously-trained uniform resource locators (URLs)), only after time-consuming, and often inaccurate, imprecise, and unreliable, voice training. Their accuracy rates are inextricably tied to a single user that has provided the voice training.

Typical efforts to implement voice-based user interaction in a support and information retrieval context may be seen in U.S. Pat. No. 5,802,526, to Fawcett et al. (Sep. 1, 1998). Typical efforts to implement voice-based user interaction in an Internet context may be seen in U.S. Pat. No. 5,819,220, to Sarukkai et al. (Oct. 6, 1998).

U.S. Pat. No. 6,446,064, to Livowsky (Sep. 3, 2002), discloses a system and method for enhancing e-commerce using a natural language interface. The natural language interface allows a user to formulate a query in natural language form, rather than using conventional search terms. In other words, the natural language interface provides a "user-friendly" interface. The natural language interface may process a query even if there is not an exact match between the user-formulated search terms and the content in a database. Furthermore, the natural language interface is capable of processing misspelled queries or queries having syntax errors. The method for enhancing e-commerce using a natural language interface includes the steps of accessing a user interface provided by a service provider, entering a query using a natural language interface, the query being formed in natural language form, processing the query using the natural language interface, searching a database using the processed query, retrieving results from the database, and providing the results to the user. The system for enhancing e-commerce on the Internet includes a user interface for receiving a query in natural language form, a natural language interface coupled to the user interface for processing the query, a service provider coupled to the user interface for receiving the processed query, and one or more databases coupled to the user interface for storing information, wherein the system searches the one or more databases using the processed query and provides the results to the user through the user interface.

U.S. Pat. No. 6,615,172, to Bennett et al. (Sep. 2, 2003), discloses an intelligent query system for processing voice-based queries. This distributed client-server system, typically implemented on an intranet or over the Internet accepts a user's queries at the user's PC, PDA, or workstation using a speech input interface. After converting the user's query from speech to text, a two-step algorithm employing a natural language engine, a database processor, and a full-text structured query language (SQL) database is implemented to find a single answer that best matches the user's query. The system, as implemented, accepts environmental variables selected by the user and is scalable to provide answers to a variety and quantity of user-initiated queries.

U.S. Patent Application Publication No. 2001/0039493, to Pustejovsky et al. (Nov. 8, 2001), discloses, in an exemplary embodiment, a system and method for answering voice-based queries using a remote mobile device, e.g., a mobile phone, and a natural language system.

U.S. Patent Application Publication No. 2003/0115192, to Kil et al. (Jun. 19, 2003), discloses, in various embodiments, an apparatus and method for controlling a data mining operation by specifying the goal of data mining in natural language, processing the data mining operation without any further input beyond the goal specification, and displaying key performance results of the data mining operation in natural language. One specific embodiment includes providing a user interface having a control for receiving natural language input describing the goal of the data mining operation from the control of the user interface. A second specific embodiment identifies key performance results, providing a user interface having a control for communicating information, and communicating a natural language description of the key performance results using the control of the user interface. In a third specific embodiment, input data determining a data mining operation goal is the only input required by the data mining application.

U.S. Patent Application Publication No. 2004/0044516, to Kennewick et al. (Mar. 4, 2004), discloses systems and methods for receiving natural language queries and/or commands and executing the queries and/or commands. The systems and methods overcome some of the deficiencies of other speech query and response systems through the application of a complete speech-based information query, retrieval, presentation, and command environment. This environment makes significant use of context, prior information, domain knowledge, and user-specific profile data to achieve a natural language environment for one or more users making queries or commands in multiple domains. Through this integrated approach, a complete speech-based natural language query and response environment may be created. The systems and methods create, store, and use extensive personal profile information for each user, thereby improving the reliability of determining the context and presenting the expected results for a particular question or command.

U.S. Patent Application Publication No. 2004/0117189, to Bennett (Jun. 17, 2004), discloses an intelligent query system for processing voice-based queries. This distributed client-server system, typically implemented on an intranet or over the Internet, accepts a user's queries at the user's PC, PDA, or workstation using a speech input interface. After converting the user's query from speech to text, a natural language engine, a database processor, and a full-text Structured Query Language (SQL) database are implemented to find a single answer that best matches the user's query. Both statistical and semantic decoding are used to assist and improve the performance of the query recognition.

Each of the systems, apparatuses, software products, and methods described above suffers from at least one of the following shortcomings. Several of the systems, apparatuses, software products, and methods require time-consuming, and often inaccurate, imprecise, and unreliable, voice training. Several of the systems, apparatuses, software products, and methods are single-modal, meaning that a user may interact with each of the systems, apparatuses, software products, and methods in only one way, i.e. each utilizes only a single voice-based input. As a result of this single-modality, there is no context or environment within which a voice-based search is performed and several of the systems, apparatuses, software products, and methods must perform multiple iterations to pinpoint a result or answer related to the voice-based search.

Thus, what is needed are natural language query systems and methods for processing voice and proximity-based queries that do not require time-consuming, and often inaccurate, imprecise, and unreliable, voice training. What is also needed are natural language query systems and methods that are multimodal, meaning that a user may interact with the natural language query systems and methods in a number of ways simultaneously and that the natural language query systems and methods utilize multiple inputs in order to create and take into consideration a context or environment within which a voice and/or proximity-based search or the like is performed. In other words, what is needed are natural language query systems and methods that mimic normal human interaction, attributing meaning to words based on the context or environment within which they are spoken. What is further needed are natural language query systems and methods that perform only a single iteration to pinpoint a result or answer related to a voice and/or proximity-based search or the like.

BRIEF SUMMARY OF THE INVENTION

In various embodiments, the present invention provides a natural language query system and method for processing voice and proximity-based queries that do not require time-consuming, and often inaccurate, imprecise, and unreliable, voice training. The present invention also provides a natural language query system and method that are multimodal, meaning that a user may interact with the natural language query system and method in a number of ways simultaneously and that the natural language query system and method utilize multiple inputs in order to create and take into consideration a context or environment within which a voice and/or proximity-based search or the like is performed. In other words, the present invention provides a natural language query system and method that mimic normal human interaction, attributing meaning to words based on the context or environment within which they are spoken. This context or environment may be prior information-based, domain knowledge-based, user-specific profile data-based, and/or, preferably, location or proximity-based. The present invention further provides a natural language query system and method that perform only a single iteration to pinpoint a result or answer related to a voice and/or proximity-based search or the like.

Functionally, the present invention provides a natural language query system and method that do more than simply convert speech to text, use this text to search a database, and convert text to speech. The natural language query system and method of the present invention are capable of understanding speech and providing appropriate and useful responses. Off-the-shelf tools are used to incorporate and combine speech recognition, natural language processing (NLP), also referred to as natural language understanding, and speech synthesis technologies. NLP understands grammar (how words connect and how their definitions relate to one another), context, and environment.

In an exemplary embodiment, a query system includes a computing device communicatively coupled to a network and configured to receive audio input and determine location information; and a server communicatively coupled to the computing device via the network, wherein the server is configured to: receive a query from the computing device; perform natural language processing on the query using lexicons and grammar rules to determine a meaning of the query;

utilize location information to further determine the meaning of the query; and perform a database look up based on the determined meaning of the query. Optionally, the computing device includes one of a smart phone or tablet device. The computing device may include Global Positioning Satellite functionality providing the location information. The computing device further may include a Radio Frequency Identification scanner providing the location information. The query system may further include a user database configured to store a plurality of queries from a plurality of users, and the server is further configured to determine the meaning of the query based upon data in the user database. The query system may further include a plurality of databases communicatively coupled to the server. The query system may further include a middleware application executed on the server, wherein the middleware application is configured to route the query to one or more of the plurality of databases and to rank accuracy of results from the one or more of the plurality of databases. The query system may further include a semantic engine module executed on the server for converting the determined query to a formal database query. The query system may further include a speech conversion module executed on the server for converting the query in audio and natural language form to text in natural language form. The query system may further include a natural language processing module executed on the server for converting the text in natural language form to text in searchable form using lexicons and grammar rules to parse sentences and determine underlying meanings of the query.

In another exemplary embodiment, a mobile device query method, includes receiving an audio query from a user; determining location information of the user based on Global Positioning Satellite functionality or Radio Frequency Identification readings; transmitting the audio query and the location information to a server; and receiving a plurality of responses to the audio query from the server, each of the plurality of responses is ranked by the server using an accuracy algorithm.

In yet another exemplary embodiment, a query method includes receiving an audio query and location information; converting the audio query into text in a natural language form; converting the text in a natural language form to text in searchable form using lexicons and grammar rules to parse sentences and determine underlying meanings of the audio query; determining a formal database query from the text in searchable form; and performing a database lookup based on the formal database query. The query method of may further include sending the formal database query to a plurality of databases including constrained semantic models; and ranking results from the plurality of databases.

BRIEF DESCRIPTION OF THE DRAWINGS

The present invention is illustrated and described herein with reference to the various drawings, in which like reference numbers denote like method steps and/or system components, respectively, and in which:

FIG. 4 is a diagram illustrating an exemplary embodiment of the present invention with a Web-enabled device connected to the speech server, a remote server, and the like to perform a natural language query over a network, such as the Internet or the like.

DETAILED DESCRIPTION OF THE INVENTION

In general, the natural language query system and method of the present invention may incorporate and combine the following technologies:

1. Speech Processing—Speech processing allows PCs, PDAs, Web-enabled phones, smart phones, tablet devices, and the like to recognize—and, to some extent, understand—spoken language. Spoken language is "eyes free" and "hands free", allowing a PC, PDA, Web-enabled phone, smart phone, tablet device, or the like to be used anywhere. This technology has engendered two types of software products: continuous-speech recognition software products and command-and-control software products. Because a context-free grammar allows a speech recognition engine to reduce recognized words to those contained in a predetermined list, high degrees of speech recognition may be achieved in a speaker-independent environment. A context-free grammar may be used with relatively inexpensive microphones, limited central processing units (CPUs), and no time-consuming, and often inaccurate, imprecise, and unreliable, voice training. Although speech processing technology is not new, speech recognition accuracy rates are just now becoming acceptable for natural language discourse.

2. Speech Synthesis—The ability to mimic speech is useful for applications that require spontaneous user interaction, or in situations where viewing or reading are impractical, such as, for example, when a PC, PDA, Web-enabled phone, smart phone, tablet device, or the like provide driving directions or instructions to the driver of a vehicle. In software products aimed at the average user, it is important that output sounds are pleasant and sound human enough to encourage regular use. Several software products now bring relatively inexpensive and effective conversational access to information applications and accelerate the acceptance of speech as a user interface alternative for Web-based and mobile applications, including, for example, Microsoft Speech Server by Microsoft Corp. Microsoft Speech Server currently supports eight languages and is based on the open-standard Speech Application Language Tags (SALT) specification, which extends familiar mark-up languages and leverages the existing Web-development paradigm.

3. Natural Language Processing (NLP) systems interpret written, rather than spoken, language and may be found in speech processing systems that begin by converting spoken input into text. Using lexicons and grammar rules, NLP parses sentences, determines underlying meanings, and retrieves or constructs responses. NLP technology's main use is in enabling databases to answer queries presented in the form of questions. Another use is in handling high-volume email. NLP performance may be improved by incorporating a common sense knowledge base—that is, a set of real-world rules. Almost all of the database query languages tend to be rigid and difficult to learn, and it is often difficult for even the most experienced user to get desired information out of a database. A natural language interface to the SQL language overcomes the need for users to master the complexities of the SQL language.

4. English Query—English query (EQ) is a component of Microsoft SQL Server 2000 by Microsoft Corp. that allows users to query databases using plain English. The EQ engine creates a database query that may be executed under program control to return a formatted answer. The development process is at a higher level than traditional programming, but may be mastered by non-programmers with some database background. In order to implement natural language searching, an authoring tool is used to provide domain knowledge to the EQ engine, and to relate database entities to objects in the domain. EQ uses verb relationships and the like to perform natural language parsing of users' questions, which provides better search results than keyword-based technologies. The goal of EQ is to identify and model all of the relationships between entities in a database, creating a semantic model that defines a knowledge domain. This enables EQ to provide answers to a relatively wide range of questions without having to identify those questions in advance.

5. Input Devices—Adding speech recognition capability to an EQ application with a microphone or the like allows a user to type or speak a question to the EQ application. Such a speech interface may also be incorporated into a PDA, smart phone, tablet device, etc. with wireless networking capability. The combination of speech recognition and EQ represents a powerful method for a user to quickly access information in a SQL Server database. Additionally, other mechanisms can be utilized for the speech input, such as voice over Internet Protocol (VoIP) and other Internet telephony mechanisms, instant messenger (IM), and the like.

6. Multimodality—Multimodality combines graphics, text, audio, and avatar output with text, ink, speech, body attitude, gaze, RFID, GPS, and touch input to provide a greatly enhanced user experience. It is enabled by the convergence of voice, data, and content, and by multimedia, Internet protocol (IP), speech, and wireless technologies hosted on a wide range of devices and device combinations. As compared to single-modal visual and voice applications, multimodal applications are more intuitive and easier to use. A user may select how to best interact with an application, which is especially useful with newer, smaller-form-factor devices. When modalities are used contemporaneously, the resulting decrease in mutual disambiguation (MD) input error rates improve accuracy, performance, and robustness.

7. Radio Frequency Identification—RFID is a generic term for technologies that automatically identify one or more objects via radio waves, using a unique serial number stored in a RFID tag. The RFID tag's antenna, tuned to receive a RFID reader's electromagnetic waves in real time, is able to transmit identification information to the RFID reader. The RFID reader converts the radio waves received from the RFID tag into digital information which, in turn, may be passed on to a business system for processing and/or storage. RFID reader technology may be integrated with PDAs via a PC Card implementation. RFID tags tend to be small and lightweight and may be read through nonmetallic materials. The RFID reader does not have to touch a RFID tag, making RFID ideal for adverse and/or unclean environments. Likewise, RFID does not require line of sight between a tag and a reader, allowing the tags to be hidden under the skin, inside clothes, within the pages of a book, etc., preserving the items usability and aesthetics. RFID tags come in two varieties: passive (low power, short range, and relatively inexpensive) and active (high power, long range, and relatively expensive). Preferably, the natural language query system and method of the present invention utilize active RFID tags that run on their own power and transmit over long distances. The battery life of a typical active RFID tag is about five years.

In an exemplary embodiment, the natural language query system and method of the present invention incorporate and combine the following exemplary components:

Web/Speech/Data Server Running Microsoft Windows 2003
Web Server: Microsoft Internet Information Services (IIS) 6.0
Database: Microsoft SQL Server 2000 SP4
Microsoft SQL Server 2000 English Query with Visual Studio .NET 2003 tools
Microsoft SQL server 2000 Full-Text Indexing
Microsoft Speech Server 1.0
Microsoft Speech Application SDK Version 1.0
Simple Object Access Protocol (SOAP) 3.0
HP iPAQ h5550 Pocket PC Running Microsoft Pocket PC 2003 Premium
HP iPAQ FA120A PC Card Expansion Pack Plus
Identec Solutions iCard III RFID Reader
Identec Solutions iD2, iQ32, and iQ8 RFID Tags
Speech Add-In For Microsoft Pocket Internet Explorer
D-Link DI-614+ Wireless Broadband Router
Speech Application Language tags (SALT) Protocol
DHTML, JavaScript, VBScript (ASP), CSS
Microsoft Visual FoxPro 8.0 SP1
Microsoft Component Services
Visual BASIC .NET using Visual Studio .NET 2003

It should be noted that components performing similar functions and/or achieving similar results may also be used, and are contemplated by the present invention.

Figure 1:
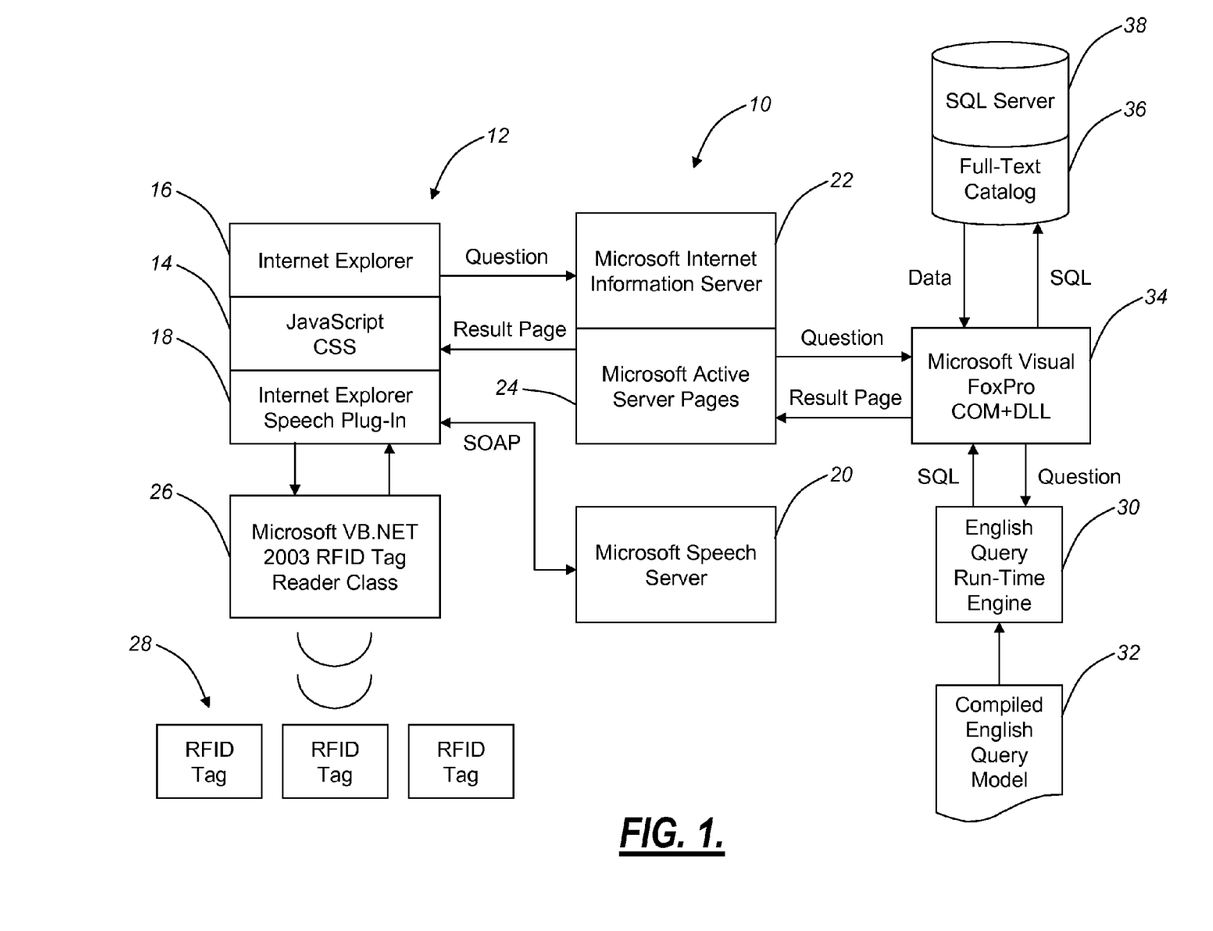
FIG. 1 is a schematic diagram illustrating one embodiment of the multimodal natural language query system and architecture for processing voice and proximity-based queries of the present invention.

Referring to FIG. 1, in an exemplary embodiment of the present invention, the natural language query system 10 includes a Web-enabled device 12, such as a portable PC (a laptop PC or the like), a PDA, a Web-enabled phone, or the like capable of accessing one or more interactive Hyper Text Mark-Up Language (HTML) or Dynamic Hyper Text Mark-Up Language (DHTML) Web pages 14 (each utilizing JavaScript, Visual basic Scripting Edition (VBScript), Active Server Pages (ASPs), Cascading Style Sheets (CSSs), etc.) via the Internet using a resident browser application 16, such as Internet Explorer or the like. It should be understood that FIG. 1 is a simplified representation of the natural language query system 10 for purposes of explanation. Further, it should be appreciated that FIG. 1 depicts the natural language query system 10 in an oversimplified manner, and a practical embodiment may include additional components and suitably configured processing logic to support known or conventional operating features that are not described in detail herein.

Preferably, the Web-enabled device 12 is mobile and may be relatively easily carried by a user. For example, the Web-enabled device 12 may include any of a laptop, a smart phone, a PDA, a tablet device, and the like. The Web-enabled device 12 includes a speech plug-in 18, such as Speech Plug-In for Microsoft Pocket Internet Explorer or the like, and is in communication with a speech server 20, such as Microsoft Speech Server 1.0 or the like. Together, the speech plug-in 18 and the speech server 20 provide the Web-enabled device 12 with the ability to receive a voice-based query from a user and convert the speech to text. Specifically, once a speak button or the like associated with the Web-enabled device 12 has been pushed, the speech plug-in 18 detects that a voice-based query has begun, records the voice-based query, and continues until silence is detected. Optionally, the display of the Web-enabled device 12 may display an audio meter that provides the user with real time feedback regarding volume, background noise, and word gaps that provide the user with an improved interactive experience with the Web-enabled device 12. The speech plug-in 18 then sends the recorded voice-based query to the speech server 20, which converts the voice-based query to text and returns the text to the Web-enabled device 12.

Preferably, the user's interaction with the Web-enabled device 12 takes place through a speech-enabled Web-page resident on a remote server 22 running one or more Active Server Pages (ASPs) 24. This Web page is displayed on the display of the Web-enabled device 12.

The Web-enabled device 12 also includes a location or proximity system or device, such as a GPS or RFID device. In the event that a RFID device is utilized, the Web-enabled device 12 includes an RFID reader 26, such as an Identec Solutions iCard III RFID Reader or the like. The RFID reader 26 automatically and wirelessly detects and receives information continuously and in real time from one or more active RFID tags 28, such as one or more Identec Solutions iD2 RFID Tags or the like, in the vicinity, each of the one or more RFID tags 28 associated with and containing information about an article of interest, place of interest, etc. Optionally, the RFID reader component 26 includes RFID tag reader class software that controls the interface between the browser of the web-enabled device 12 and the RFID reader engine. This RFID tag reader class software incorporates complex fuzzy logic and enables the accurate reading of the RFID tags 28 in real time in support of a mobile user. In general, the RFID reader 26 (or GPS) provides location or proximity information to the Web-enabled device 12 and the natural language query system 10. This location or proximity information and the converted text associated with the user's voice-based query are sent to the remote server 22 for subsequent processing. That is, the natural language query system 10 may utilize the location or proximity information in conjunction with the user's voice-based query for understanding or analyzing the user's voice-based query. Based on the location or proximity information received from the RFID reader 26 and the Web-enabled device 12, the remote server 22 retrieves a relevant set of information, images, and/or links which are sent to the Web-enabled device 12 and displayed in the form of one or more Web-pages on the display of the Web-enabled device 12. As those of ordinary skill in the art will appreciate, most conventional Web-enabled devices 12 include GPS functionality, and the present invention contemplates utilizing this GPS functionality to provide the location or proximity information.

If there are no problems with the converted text associated with the user's voice-based query, NLP is then carried out at the remote server 22. First, a semantic engine "interprets" the text associated with the user's voice-based query and converts the text into a formal database query. The semantic engine includes an English query run-time engine 30 and a compiled English query model 32. A database look-up is then performed using the formal database query and the result is sent back to the remote server 22 and finally the Web-enabled device 12, which may form one or more Web-pages incorporating the result. The database look-up may be performed by Microsoft Visual FoxPro COM+DLL 34 or the like, a full-text catalog 36, and a SQL server 38. Advantageously, the location or proximity information and the converted text associated with the user's voice-based query received from the Web-enabled device 12 represent multimodal inputs. The location or proximity information provide a context or environment that is used to narrow and streamline the database look-up related to the converted text associated with the user's voice-based query. This is illustrated in the example below.

Optionally, the remote server 22 may also create a voice-based response that is sent to the Web-enabled device 12 and converted into a speech output. Additionally, the remote server 22 can be configured to produce a "conversational agent" or "avatar", i.e. a three-dimensional on-screen "face" that realistically expresses the words by meshing Text-to-Speak (TTS) output with a talking head. Because the natural language query system 10 is multimodal, the user can react with the natural language query system 10 by either speaking or by tapping the display of the Web-enabled device 12. For example, when link in the results Web page is tapped, more detail, including images, may be returned to the Web-enabled device 12.

Figure 2:
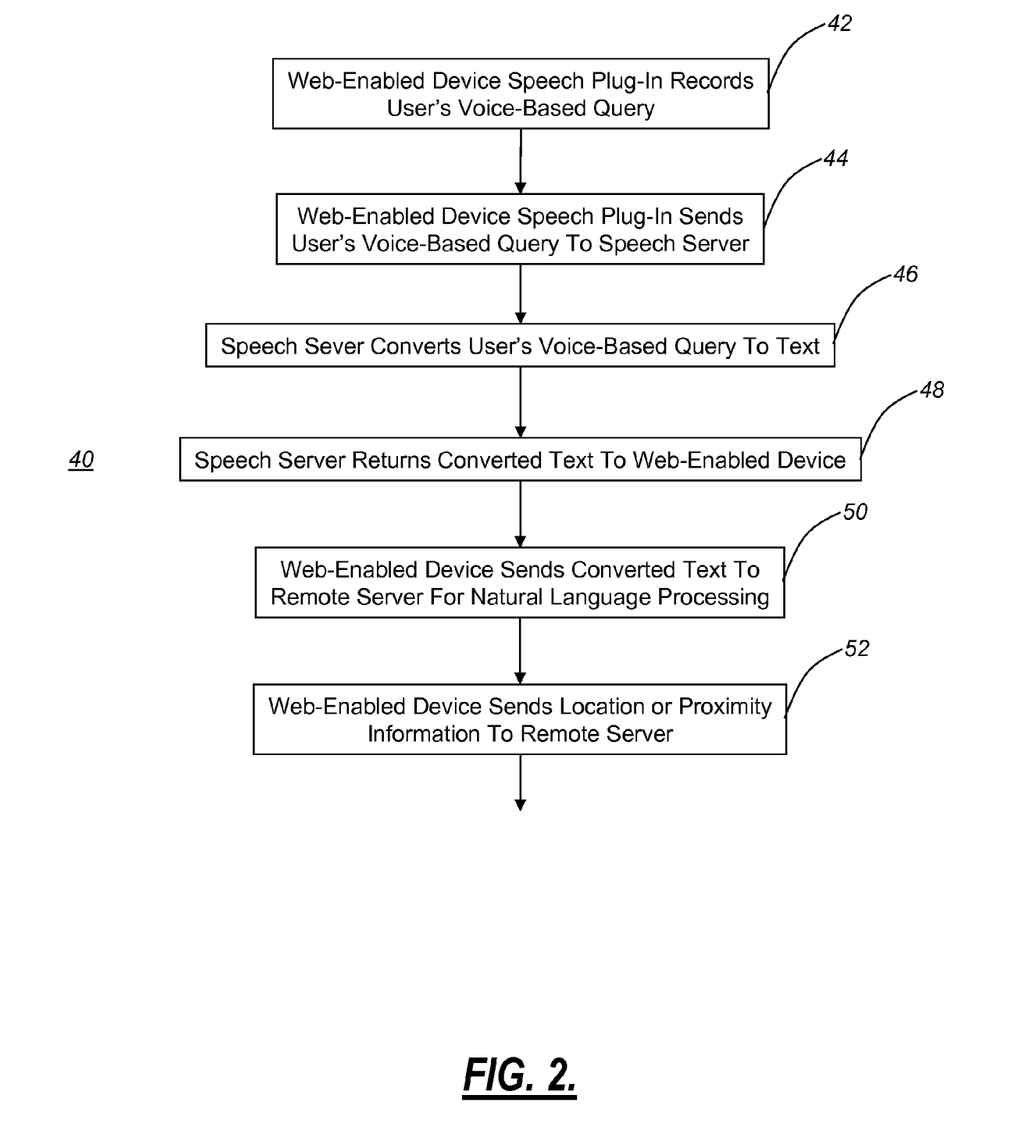
FIG. 2 is a flow chart illustrating one embodiment of the multimodal natural language query method for processing voice and proximity-based queries of the present invention.
Figure 3:
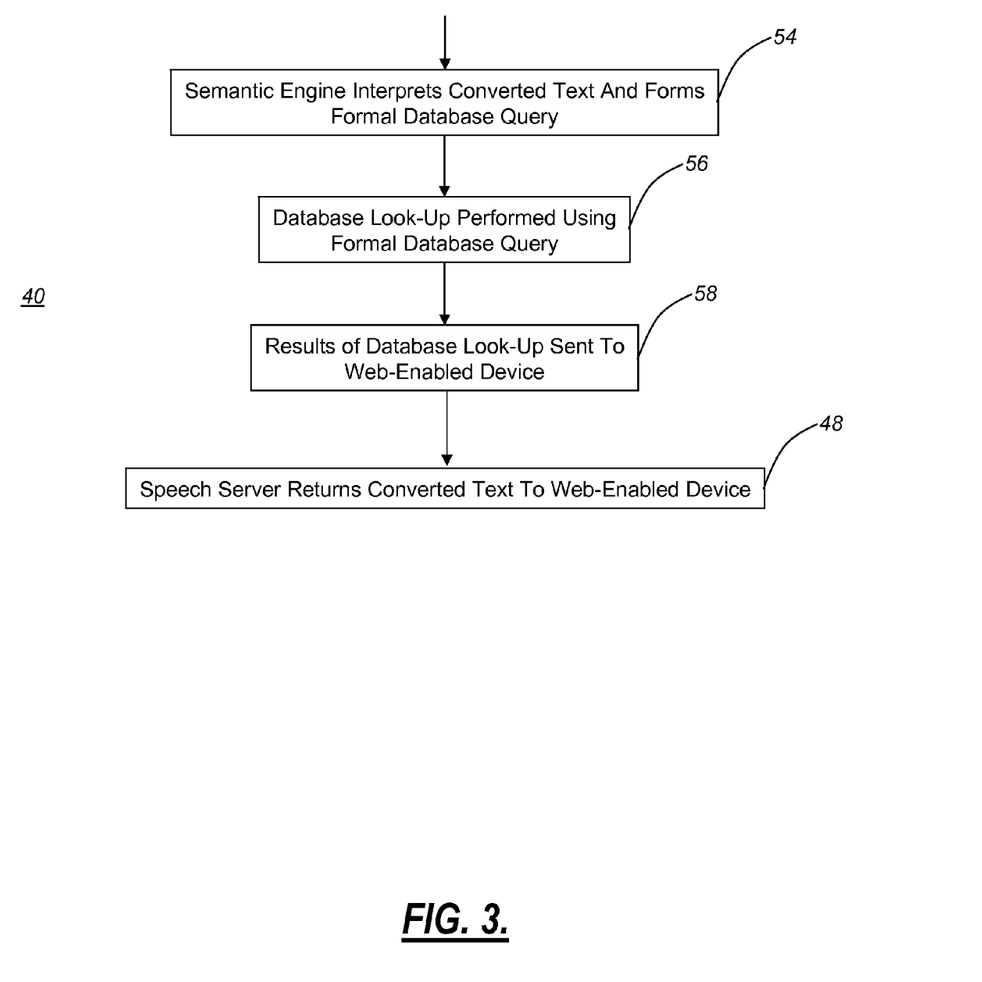
FIG. 3 is a continuing flow chart illustrating one embodiment of the multimodal natural language query method for processing voice and proximity-based queries of the present invention.

Referring to FIGS. 2 and 3, in another exemplary embodiment of the present invention, the natural language query method 40 includes receiving a voice-based query from a user using, for example, the speech plug-in 18 (FIG. 1) of the Web-enabled device 12 (FIG. 1) (Block 42) and converting the voice-based query to text using the speech server 20 (FIG. 1) (Block 46). Specifically, once the speak button or the like associated with the Web-enabled device 12 has been pushed, the speech plug-in 18 detects that a voice-based query has begun, records the voice-based query, and continues until silence is detected. For example, if the user is a patron visiting a particular exhibit in an art museum, the user's query may be "who painted this picture?" As described above, the display of the Web-enabled device 12 may display an audio meter that provides the user with real time feedback regarding volume, background noise, and word gaps that provide the user with an improved interactive experience with the Web-enabled device 12. The speech plug-in 18 then sends the recorded voice-based query to the speech server 20 (Block 44), which converts the voice-based query to text (Block 46) and returns the converted text to the Web-enabled device 12 (Block 48). Preferably, the user's interaction with the Web-enabled device 12 takes place through a speech-enabled Web-page resident on the remote server 22 (FIG. 1) running one or more ASPs 24 (FIG. 1). This Web page is displayed on the display of the Web-enabled device 12.

As described above, the RFID reader 26 (FIG. 1) provides location or proximity information to the Web-enabled device 12 and the natural language query system 10 (FIG. 1). This location or proximity information and the converted text associated with the user's voice-based query are sent to the remote server 22 for subsequent processing (Blocks 50 and 52). For example, each of the exhibits in the art museum is preferably equipped with a corresponding RFID tag 28 (FIG. 1). Thus, the Web-enabled device 12 and the natural language query system 10 "know" which painting the user is standing in proximity to when the user asks "who painted this picture?" Based on the location or proximity information received from the RFID reader 26 and the Web-enabled device 12, the remote server 22 retrieves a relevant set of information, images, and/or links which are sent to the Web-enabled device 12 and displayed in the form of one or more Web-pages on the display of the Web-enabled device 12.

If there are no problems with the converted text associated with the user's voice-based query, NLP is then carried out at the remote server 22. First, a semantic engine "interprets" the text associated with the user's voice-based query and converts the text into a formal database query (Block 54). The semantic engine includes an English query run-time engine 30 (FIG. 1) and a compiled English query model 32 (FIG. 1). A database look-up is then performed using the formal database query (Block 56) and the result is sent back to the remote server 22 and finally the Web-enabled device 12 (Block 58), which forms one or more Web-pages incorporating the result. Advantageously, the location or proximity information and the converted text associated with the user's voice-based query received from the Web-enabled device 12 represent multimodal inputs. The location or proximity information provide a context or environment that is used to narrow and streamline the database look-up related to the converted text associated with the user's voice-based query.

As described above, the natural language query system 10 is configured to analyze and process a query, such as, for example "who painted this picture?" A logical extension to making a query is in merging a command or directive with the query to enhance the end result. For example, take the simple query "How many three bedroom houses are for sale on Elm Street in Scranton?" A user may state the "question" as part of a command and simultaneous add value to the request: "Map all three bedroom houses that are for sale on Elm Street in Scranton and email that to Fred Jones". The natural language query system 10 may be configured to receive this command and process accordingly. Other examples of similar verb-based requests are chart and sort/order by.

Figure 4:
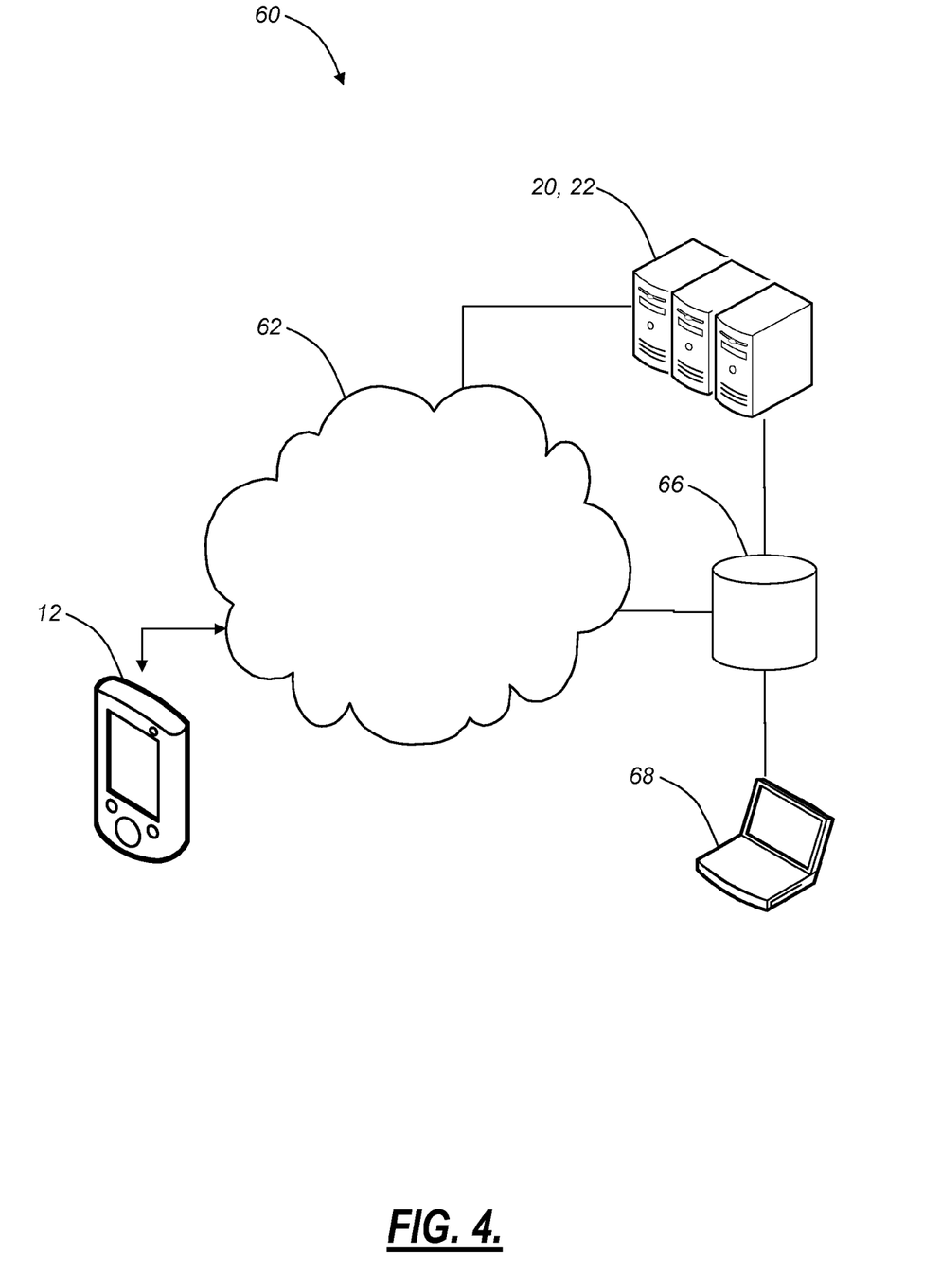

Referring to FIG. 4, in an exemplary embodiment of the present invention, the Web-enabled device 12 connects to the speech server 20, the remote server 22, and the like to perform a natural language query over a network 62, such as the Internet or the like. The network 62 connection can include a wireless, wired, or the like connection. The present invention contemplates any physical network 62 connection and network protocol, such as IP, VoIP, Public Switched Telephone Network (PSTN), DSL, WLAN, Cellular (e.g., CDMA, GSM, and the like), cable modem, and the like. In an exemplary embodiment, the Web-enabled device 12 may include, for example, a laptop, a smart phone, a tablet device, a personal digital assistant, or the like. Further, the present invention contemplates a variety of applications for communication over the network 62, such as, but not limited to, Twitter, Instant Messaging (IM), Short Message Service (SMS), Multimedia Messaging Service (MMS), and the like.

Optionally, the servers 20,22 can connect to a user database 66 such as through a local area network (LAN) connection, the Internet, or the like. The user database 66 provides an infrastructure to capture detailed information about user behaviors through the Web-enabled device 12, such as (1) the physical location of the user when a question was asked (e.g., based on the RFID tag on the Web-enabled device 12), (2) the question asked by the user, (3) the SQL query generated by the server 20,22 or an error condition, if applicable, and (4) the answer generated by the server 20,22. For example, the user database 66 can be configured to capture this information and other information based on user queries from multiple Web-enabled devices 12. This captured information is, in effect, capturing behavior and insights into user's thinking not possible before. Aggregated across many users, organizational behaviors can be gleaned.

This information allows for interesting analytics to be explored. For example, the user database 66 can be connected to the Internet or a LAN and accessed by a network administrator or the like over a computer 68 for performing analysis of data stored in the user database 66. Because a question can be asked in a myriad of ways, but will generate the same SQL query, this information can correlate result frequencies back to questions. Because the natural language query system of the present invention removes many of the current barriers to getting questions answered in a timely fashion, implementation of a system is likely to unleash a flood of questions that people have wanted to ask in the past, but did not because (1) it took too long to get an answer via traditional methods or (2) because they did not have access to any tools that could do the job adequately.

Advantageously, the natural language query system removes obstacles to capture some potentially very interesting and never before measured behaviors and insights into user's thinking. For example, a user could perform frequency analysis on questions and results to get an idea of what kinds of information people in an organization are looking for the most. This could be used for optimization within the organization. Also, it is possible to discover "interesting" questions that someone deep down in the organization is asking, which may not have been noticed before. This leads to more of an atmosphere of "information democratization", where more people in the organization become more valuable because the cost to test their ideas goes to almost zero. The user database 66 could be accessed through standard mechanisms known in the art and the computer 68 could include custom analysis tools or off-the-shelf tools, such as spreadsheets, database access modules, and the like, to perform such analysis.

It follows that one unique way of presenting analytics may include a standard visual "dashboard" in which each metric is represented by an English language question/query. Dashboard presentation approaches are common in current business intelligence (BI) implementations, displaying multiple metrics at once in separate panes, often in the form of charts and graphs. Business intelligence (BI) refers to computer-based techniques used in spotting, digging-out, and analyzing business data, such as sales revenue by products and/or departments, or by associated costs and incomes. BI technologies provide historical, current, and predictive views of business operations. Common functions of business intelligence technologies are reporting, online analytical processing, analytics, data mining, business performance management, benchmarking, text mining, and predictive analytics. However, specifying how to calculate each metric is tedious in conventional BI systems; using plain English questions to generate the metric results would be a major innovation in the space. For example, the present invention may be utilized as a front-end interface to various BI systems.

In another exemplary embodiment, the present invention has the ability to trace the "steps" of a person's search in chronological order, which can render the "decision tree" they used to get to their answer. For example, many users will go through a series of related questions in order to refine their search criteria; this would allow interesting types of analysis to be done across all users. An analogue to this is clinical pathways, a large standard decision tree used by physicians to analyze patient conditions and come to a diagnosis; pathways are based on a great deal or prior collected knowledge. Anaphoric referencing (meaning that you can refer to earlier queries), is used to help make the query session more natural to a human. For example, the query "Who received the highest bonus?" might be followed by "Who is his manager?" Or, for example, a person asks a question like "How many houses in Apple County have 4 bedrooms?" and the system responds "554 homes". Then the user immediately asks "How many of those have a pool?" The system recognizes that "those" refers to the most immediate past question by that user and we run a subset of that query.

Currently, research indicates high accuracy rates when a "domain" of information is constrained. For example, a system may work against a particular database (e.g., airline flights, real estate listings, etc.) and the system may render very accurate results for all kinds of questions associated with the constrained information. However, this does not scale well when applied to broader more general topics (such as the entire Google database). In an exemplary embodiment, a middleware layer may be created that can analyze an incoming question and automatically route it to one or more constrained semantic models simultaneously, and then determine which of the attempts returned the best answer instead of using a broad database. This may include an accuracy algorithm that determines accuracy on an individual domain query, "scorecarding" and ranking results from multiple domains and returning the best results to the user.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A query system, comprising:
   a computing device communicatively coupled to a network and configured to receive audio input comprising a query and determine location information; and
   a server communicatively coupled to the computing device via the network, wherein the server is configured to:
   receive the query from the computing device;
   perform natural language processing on the query using lexicons and grammar rules to parse sentences and determine a meaning of the query, wherein the natural language processing comprises converting text in natural language form to text in searchable form using the lexicons and grammar rules to determine the meaning of the query;
   utilize location information to further determine the meaning of the query;
   perform a database look up based on the determined meaning of the query, wherein the database look up is provided with a context and environment for narrowing and streamlining the database look up utilizing the location information; and
   rank responses of the database lookup using an accuracy algorithm.

2. The query system of claim 1, wherein the computing device comprises one of a smart phone or tablet device.

3. The query system of claim 2, wherein the computing device comprises Global Positioning Satellite functionality providing the location information.

4. The query system of claim 3, wherein the computing device further comprises a Radio Frequency Identification scanner providing the location information.

5. The query system of claim 1, further comprising a user database configured to store a plurality of queries from a plurality of users.

6. The query system of claim 5, wherein the server is further configured to:
   determine the meaning of the query based upon data in the user database.

7. The query system of claim 1, further comprising a plurality of databases communicatively coupled to the server.

8. The query system of claim 7, further comprising a middleware application executed on the server, wherein the middleware application is configured to route the query to one or more of the plurality of databases and to rank accuracy of results from the one or more of the plurality of databases.

9. The query system of claim 1, further comprising a semantic engine module executed on the server for converting the determined query to a formal database query.

10. The query system of claim 1, further comprising a speech conversion module executed on the server for converting the query in audio and natural language form to text in natural language form.

11. The query system of claim 10, further comprising a natural language processing module executed on the server for converting the text in natural language form to text in searchable form using lexicons and grammar rules to parse sentences and determine underlying meanings of the query.

12. A mobile device query method, comprising:
   receiving an audio query from a user;
   determining location information of the user based on Global Positioning Satellite functionality or Radio Frequency Identification readings;
   transmitting the audio query and the location information to a server; and
   receiving a plurality of responses to the audio query from the server, each of the plurality of responses is ranked by the server using an accuracy algorithm;
   wherein the server is configured to:
   perform natural language processing on the audio query using lexicons and grammar rules to parse sentences and determine a meaning of the audio query, wherein the natural language processing comprises converting text in natural language form to text in searchable form using the lexicons and grammar rules to determine the meaning of the audio query;
   utilize the location information to further determine the meaning of the audio query; and
   perform a database look up based on the determined meaning of the audio query, wherein the database look up is provided with a context and environment for narrowing and streamlining the database look up utilizing the location information.

* * * * *